United States Patent Office 3,545,993
Patented Dec. 8, 1970

3,545,993
PIGMENT
Eugene Wainer, Shaker Heights, Ohio, assignor to Horizons Incorporated, a Division of Horizons Research Incorporated, a corporation of Ohio
No Drawing. Filed Aug. 2, 1967, Ser. No. 657,799
Int. Cl. C08h *17/04;* C09c *1/28*
U.S. Cl. 106—288             11 Claims

ABSTRACT OF THE DISCLOSURE

A composite pigment comprising particles exhibiting substantially complete water insolubility and consisting of a core of calcium sulphophosphate resulting when crushed wollastonite ($CaSiO_3$) is treated with sulfuric and phosphoric acids in water solution, said core being enveloped in an encasement based on the reaction of the surface layer of the core particle with a hydrate, oxide or hydrous oxide of Al, Zn, Fe, Co, Ni, Mn or Cr or mixtures thereof and the process by which said pigment is produced.

---

This invention relates to pigments. More particularly, it relates to pigments prepared by the addition of certain oxides or hydrates to wollastonite which has been digested in a mixture of sulphuric and phosphoric acids, e.g., as described in my British specification 641,608, the disclosure of which is incorporated herein by reference.

The pigment product produced by the procedures described in the above noted specification is quite satisfactory for some purposes, for example, as a filler in rubber compounding, but is not altogether acceptable as a pigment for other purposes, such as in paper coating.

It has been found that the products that are defined in the above noted specification have several defects which limit the usefulness of the products to the point where the products have little or no practical value for many purposes. For instance, on storing these products for several weeks a distinct crystalline growth develops and this crystalline growth is greatly accelerated if the atmosphere is at all humid. As a consequence of this crystalline growth, the abrasive index of the material claimbs very sharply to unacceptable levels. In some cases, the crystalline growth proceeds to such an extent that the pigment actually feels gritty and lumpy to the touch. A more serious defect is the water solubility of the pigment. In many applications water solubility does not represent a drawback, but if the pigment is utilized as a filler for paper and is to be added in the beater where the material is directly in contact with water for lengthy periods of time, the water solubility is high enough so that a serious loss of pigment values occurs. Under these conditions, between 10 and 20 percent of the pigment value is lost through solubilizing. Furthermore, if the beater dispersions are held in a quiescent situation for any length of time, the crystalline growth defect is aggravated. Finally, it has been found that the abrasive index of the pigments as described in British Specification 641,608 is particularly sensitive to the time and temperature of drying. Generally, the higher the temperature, the more abrasive the material, due possibly to the development of horny masses from the silica gel which is produced in the first portion of the process. All of these defects taken together seriously interfere with the use of the material for many purposes.

It has been found that through additions of certain materials to the pigment during its preparation, that a drastic and beneficial change in the physical and chemical characteristics of the pigment can be imparted. These changes comprise a smaller and more uniform particle size, a lower bulk density, a higher brightness level, a complete storage stability without growth of crystals and without increase in the abrasive index, a lower abrasive index to begin with, the imparting of an unctuous feel not previously available, and a reduction in solubility even on long standing in water to a range between 0 and 1 percent. Further, it has been found either vary white high brightness pigments or deeply colored materials can be produced economically. These effects are obtained by digesting the material as defined in British Specification 641,608 with appropriate amounts of the hydrates or oxides of aluminum, zinc, iron, cobalt, nickel, manganese, or chromium. It appears probable that these positively charged materials (when dispersed in water) may react with the silica gel to produce the corresponding hydrated metal silicates which act as an encasement for the calcium sulphophosphate particles heretofore produced and the production of such metallic silicates acting as an encasement accounts for the unctuous feeling, the low bulk density, the lack of solubility, the low abrasive index, and the exceptional depth of the color which is produced when agents other than alumina or zinc oxide are utilized for the reaction.

Typical properties which are achieved through the use of the additives in the manner hereinafter described are stable particles having sizes all below 0.5 micron with the average particle size in the range of 0.1 to 0.3 micron; pH values of about 6.5 on dispersion of water; bulk densities of about 0.08 to 0.12 gram per cc. which is equivalent to 5 to 8 lbs. per cubic foot; an unctuous feeling equivalent to that available from high grade talc; and water solubilities less than 1 percent.

All of the above-noted oxides which may be used as additives for the metallic silicate type of encasement exhibit a pH, when dispersed in water, less than that which would be exhibited by an equivalent amount of lime. When lime or magnesia are used as modifiers in the process, the products tend to be somewhat more abrasive and the particle size more coarse than when the recommended materials noted above are utilized. In summary, it appears that in order for the additives to be effective for the purposes described in this specification, the pH of the material utilized as an additive must be less than that exhibited by an equivalent amount of lime in a similar water dispersion.

While the weak acid salts of the various oxygenous additives may be utilized for the purposes of this invention, in the preferred additives these materials are in the form of the reactive oxides or hydrates. Zinc oxide as it is normally available as an article of commerce in pigment form, is sufficiently reactive with silica gel in such form to be used without further treatment. However, the remaining types of additives need to be used in a form generally designated in the trade as "precipitated," or "light grade." These terms are intended to define the nature of the compound that is preferred as the most reactive form of the oxide or hydrate available commercially. Usually, they are prepared by precipitation from solution and thoroughly washed to yield the pure hydrate in each case and then dried under very mild conditions, usually below the boiling point of water and sometimes with the help of reduced pressure so as to reduce agglomeration of the particles and retain chemical reactivity as much as possible. The desired chemical reactivity may also be retained by spray drying. Generally, the drying is carried out under such conditions that only excess water is removed, retaining as much as possible of the chemically combined water needed to form the hydrate. Another suitable type of drying carried out so as to retain maximum chemical reactivity involves drying the materail below the boiling point of water under a controlled humidity atmosphere. Under such conditions of preparation, all of the oxides or hydrates of the preferred additives react easily with weak acids.

The first step in the preparation of the novel pigments of the present invention is the preparation of a dispersion of wollastonite in water. The wollastonite has been crushed to a particle size between minus 100 mesh and minus 325 mesh. A water solution of sulphuric acid or of a combination of sulphuric acid and phosphoric acid is then prepared, e.g., by dilution of one liter of acid in 4 liters of water. After cooling to room temperature, the diluted or mixed acids are then added to the water dispersion of wollastonite slowly, over a period of about one hour. The mixture is then stirred for a time sufficient to complete the reaction. Completion is indicated when a pH of 6 is reached. Without extra heating this requires a time period of about 1.5 to 2 hours for batches of about 50 lbs. of finished pigment. If such a batch is maintained at a temperature of 80 to 95 degrees C., the pH of 6 or higher is reached in about 30 minutes to 1 hour. If during the digestion the reaction mixture is too thick to be stirred easily, extra water is added to facilitate stirring. The additives taken from the class of the reactive oxides or hydrates of aluminum, zinc, iron, chromium, manganese, cobalt and nickel are made up in a thin slurry with water and then added slowly to the reacted wollastonite batch while stirring vigorously. Normally 20 to 30 minutes is required to complete the reaction with the additive. Water is added as needed to facilitate stirring and thereafter the final reaction mixture is digested at a temperature of 80 to 95 degrees C. for 4 hours. At the end of this period, the reaction mixture attains a pH value in the range of 6.5 to 6.7. The reacted mixture is then filtered, washed briefly with water and dried at about 100 to 110 degrees C. After micropulverizing, it is packed ready for use.

A significant feature of the pigments made with the colored oxides is the extreme depth of color which is achieved by the procedures indicated. For example, the iron oxide modified pigments are a deep red; the chromium oxide modified pigment is a deep green; the manganese oxide modified pigment is brown; the nickel oxide modified pigment is gray-green to green-black; the cobalt oxide modified pigment is gray-black to black; while the aluminum oxide and zinc oxide modified pigments are white, both exhibiting a brightness of the order of 96.

The amount of the active oxides or hydrates of these specialized additives utilized in order to obtain a product exhibiting the desired small particle size, low bulk density, and insolubility in water generally is between about 0.5 to 2.0 moles of the respective additive per mole of calcium silicate, a ratio of 1.0 mol of the reactive oxide or hydrate to 1.0 mol of wollastonite being preferred. In the case of the colored pigments where a combination of color, water insolubility, small particle size and low bulk density is desired with depth of color being the controlling requirements, the amount of additive is as much as 2 moles of colored active oxides or hydrates for each 1 mol of purified wollastonite. Thus, as in the case of cobalt hydrate, 1 mol of cobalt hydrate per mol of wollastonite will yield a gray-black pigment, whereas 2 moles will produce a black pigment. Thus, different shadings of colors can be obtained by modifying the concentration of coloring additives within the range of 0.5 to 2.0 moles of colored hydrate per mol of calcium silicate.

The following are specific examples of preferred methods of preparation and are not intended to limit the invention.

EXAMPLE 1

26.9 lbs. of minus 200 mesh calcium silicate in the form of 99.8 percent pure wollastonite is stirred into 60 liters of water to disperse the wollastonite. To the stirred wollastonite slurry, a cold solution of mixed sulphuric-phosphoric acids in water is added slowly utilizing about 1 hour for this addition, the addition being made with constant stirring. The cold solution of mixed acids was prepared by mixing 5.15 liters of 98 percent sulphuric acid, 0.705 liter of 75 percent phorphoric acid of specific gravity 1.75 and 20 liters of water. In the course of the addition of the mixed acid to the dispersed wollastonite, the temperature rises from room temperature to about 85 degrees C., and at the end of the 1 hour addition time, the pH was approximately 5.5. Heating of the solution was carried out in order to maintain a temperature at approximately 85 degrees C., and the stirring was continued with digestion at this temperature for approximately 30 minutes at which time the pH of the solution was 6.0. A slurry of 18.1 lbs. of light grade aluminum hydrate dispersed in 10 liters of water was then added slowly with stirring. The temperature of the batch was then raised to a level of 85 to 95 degrees C. and maintained at this temperature and the batch digested for 4 hours at this temperature. A slight and gradual thickening developed in the course of this digestion and at the end of the digestion, 20 liters of water heated to 85 degrees C. was added and the stirring continued for a few minutes more. Then the batch was filtered and washed with 50 liters of cold water on the filter, after which the pigment was dried at 110 degrees C., disintegrated by passage through a micropulverizer and then packed. A yield of 67.4 lbs. of white pigment was obtained.

Evaluation of the product produced by the above detailed process established that the pigment exhibited a brightness of 96 percent, a bulk density of 0.11 gram per cc., an average particle size of 0.22 micron, and a solubility in cold water at room temperature of less than 0.4 percent after several hours. The pH of the water dispersion was 6.7. The pigment had an unctuous feeling and microscopic examination indicated that the pigment was comprised of a core of the sulphates and phosphates of calcium surrounded by a sheath of material, probably aluminum silicate. The abrasive index was less than 2, equivalent to the best kaolin clays utilized for paper manufacture.

EXAMPLE 2

The procedure utilized in Example 1 was followed throughout, except that the phosphoric acid was omitted from the acid added to the wollastonite. 34.8 lbs. of minus 325 mesh wollastonite was utilized in the original slurry and 29.4 lbs. of 98 percent sulphuric acid diluted with water was utilized. 23.2 lbs. of white grade aluminum hydrate was used as the modifying additive, slurried as in Example 1, and after digestion filtering and washing, and drying as in Example 1, a yield of 101 lbs. of white pigment was obtained. The properties of this pigment were as follows: a bulk density of 0.10 gram per cc., a brightness of 94 percent, an average particle size of 0.22 micron, a solubility in water of 0.37 percent, a pH of a water dispersion of 6.6, and again an abrasive index of less than 2.

EXAMPLE 3

Example 1 was repeated, except that freshly precipitated chromium hydrate was utilized in place of the aluminum hydrate. The chromium hydrate was prepared by precipitation with ammonia from a water soluble salt and thoroughly washed to remove acid constituents and salts. The amount of chromium hydrate gel utilized for pigment preparation was equivalent to 53.8 lbs. of chromium trioxide. A deep green colored pigment was obtained weighing 140 lbs., the bulk density was 0.10 gram per cc.; the particle size (average) was 0.16 micron; the pH of the dispersion in water was 6.7; and the abrasive index was equivalent to a high purity papermaker's kaolin. Examination under the microscope indicated that the pigment represented an encasement of a deep green material surrounding a white core.

EXAMPLE 4

Example 1 was repeated, except that the 18.1 lbs. of aluminum hydrate was replaced with 28.7 lbs. of zinc oxide. An extremely white pigment was obtained weighing 77 lbs., exhibiting a bulk density of 0.12 gram per cc., a brightness of 96 percent, a particle size of 0.21 micron, a water solubility of 0.5 percent, a pH on dispersion of water of 6.9, and an abrasive index equivalent to that available from high grade papermaker's kaolin.

EXAMPLE 5

The procedure in Example 1 was repeated, except that freshly precipitated cobalt hydrate in an amount equivalent to 29.5 lbs. of cobalt sesquioxide was utilized as the additive. 89 lbs. of a black product was obtained, having a particle size of 0.16 micron, a solubility in water of 0.67 percent, a pH in water dispersion of 6.6, a bulk density of 0.12 gram per cc., and exhibiting an unctuous feel.

EXAMPLE 6

Example 5 was repeated, except that an amount of cobalt hydrate equivalent to 59 lbs. of cobalt sesquioxide was utilized. 134 lbs. of particles were obtained exhibiting a deep black color, an average particle size of 0.18 micron, a bulk density of 0.12 gram per cc., a solubility in water of 0.32 percent, a pH on dispersion of water of 6.6, and an unctuous feel. Again, the examination under a microscope indicated that the pigment was comprised of a composite particle, containing a white color completely surrounded by a black tight envelope.

EXAMPLE 7

The procedures of Examples 5 and 6 were repeated utilizing 1 and 2 moles of each of manganese and nickel as the modifying additives. The product was a light brown pigment with a 1 mole addition of manganese and deep brown pigment with a 2 mol addition of manganese. For nickel a greenish-black pigment was obtained with the 1 mol addition and a deep black with green overtones was obtained with a 2 mol addition.

I claim:
1. A process for producing a water-insoluble pigment from a starting material comprising calcium silicate, which comprises:
   (a) digesting particles of said calcium silicate in an aqueous acidic solution of at least one mineral acid selected from the group consisting of sulfuric acid, phosphoric acid and mixtures of said acids, until the digestion is substantially complete, as evidenced by a pH of about 6 in the digestion mass;
   (b) dispersing in the substantially completely reacted mixture at least one oxygenous compound of a metal selected from the group consisting of Al, Zn, Fe, Cr, Mn, Co and Ni, said compound being selected from the group consisting of oxides, hydrates and hydrous oxides of said metals between about 0.5 mol and 2 moles of oxygenous metal compound being dispersed in said reacted mixture for each mol of calcium silicate originally present in said starting material;
   (c) maintaining said metal compound dispersed in the resulting mixture until reaction between the digested calcium silicate starting material and the dispersed metal compound is substantially complete; and then
   (d) separately recovering the solid particles from the liquid portion of the reacted mixture, said solid particles constituting the desired pigment.
2. The process of claim 1 wherein the pigment is recovered from the reaction mixture by filtering.
3. The process of claim 1 wherein digestion of the mixture is at a temperature of about 80 to 95° C.
4. The process of claim 1 wherein the added material imparts a color to the resulting pigment.
5. The process of claim 1 wherein the calcium silicate starting material is provided as wollastonite.
6. The process of claim 5 wherein there are between about 0.5 and 2.0 moles of added material for each mol of wollastonite originally treated with acid.
7. A pigment consisting of particles having an average particle size of less than 0.5 micron and consisting of a particle of calcium silicate after it has been digested in a mixture of mineral acids and a coating encasing said particle, said casing consisting of the reaction product of the surface of said particle with an oxygenous compound of a metal selected from the group consisting of Al, Zn, Cr, Mn, Fe, Ni and Co, said oxygenous compound being selected from the group consisting of oxides, hydrates and hydrous oxides.
8. The pigment of claim 7 exhibiting a water solubility of less than 1% when measured in water at room temperature, an abrasive index of less than 2, and an unctuous feeling.
9. The pigment of claim 7 wherein the encasement providing compound is aluminum hydrate.
10. Calcium sulphophosphate silicate particles having an oxide of at least one metal selected from the group consisting of Al, Zn, Fe, Cr, Mn, Co and Ni encasing said particles.
11. A composite pigment consisting of a central core of a mixture of sulphates and phosphates of lime surrounded by a light water-insoluble outer case consisting of at least one oxygenous compound of a metal selected from the group consisting of Al, Zr, Cr, Mn, Fe, Co and Ni, said case being chemically bonded to said core and said pigment particles being finer than 0.5 micron.

References Cited
UNITED STATES PATENTS
2,920,974   1/1960   Allen _____ 106—288I

FOREIGN PATENTS
641,608   8/1950   Great Britain _____ 106—306

JAMES E. POER, Primary Examiner

U.S. Cl. X.R.
106—292, 299, 302, 308, 309